Figure 1:
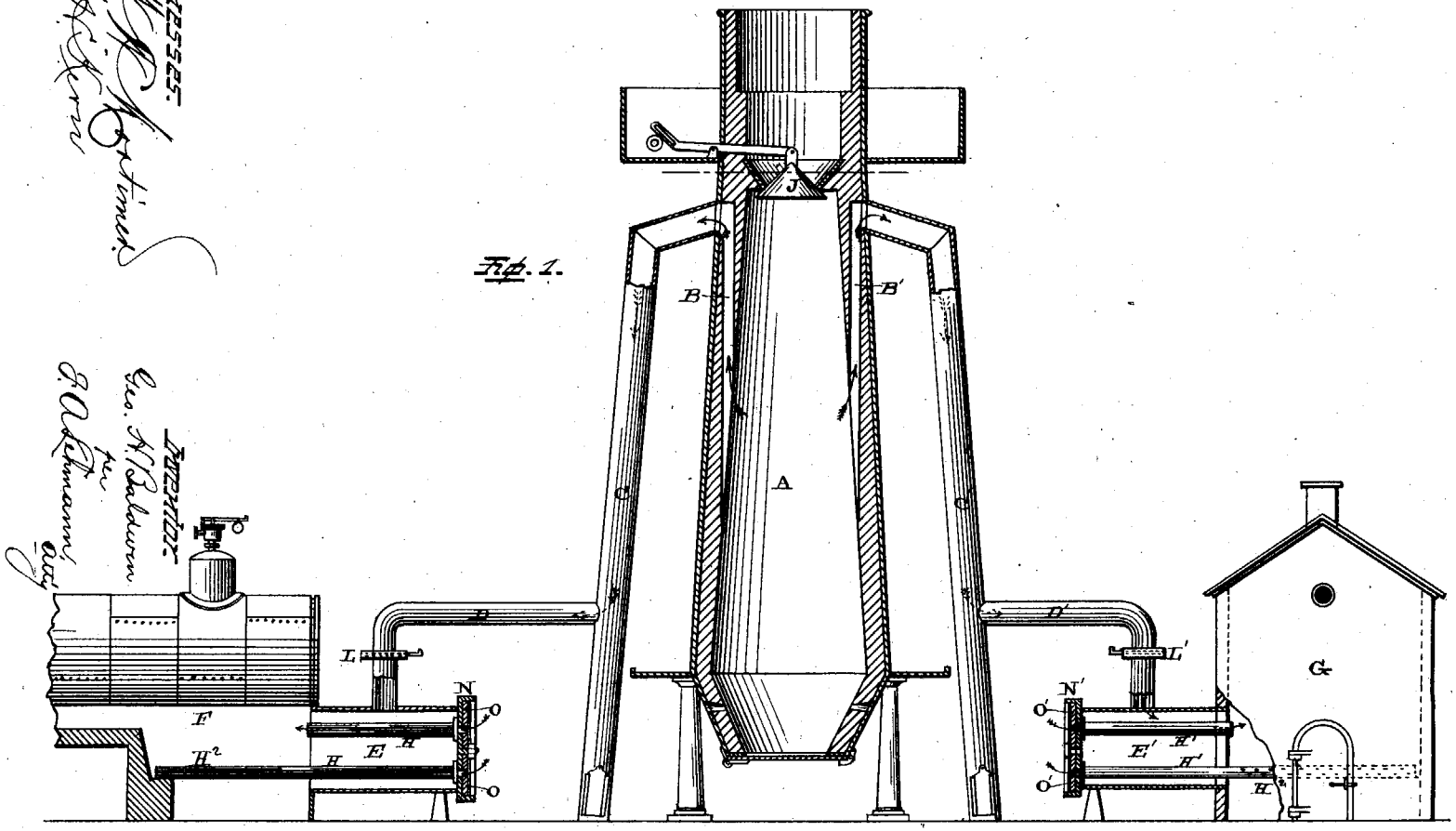

2 Sheets—Sheet 1.

G. H. BALDWIN.

GAS FURNACE.

No. 10,329. Reissued May 22, 1883.

Witnesses.
W. H. Mortimer
W. H. Kern

Inventor.
Geo. H. Baldwin
per
F. A. Lehmann,
atty

N. PETERS. Photo-Lithographer. Washington, D. C.

2 Sheets—Sheet 2.
G. H. BALDWIN.
GAS FURNACE.
No. 10,329. Reissued May 22, 1883.
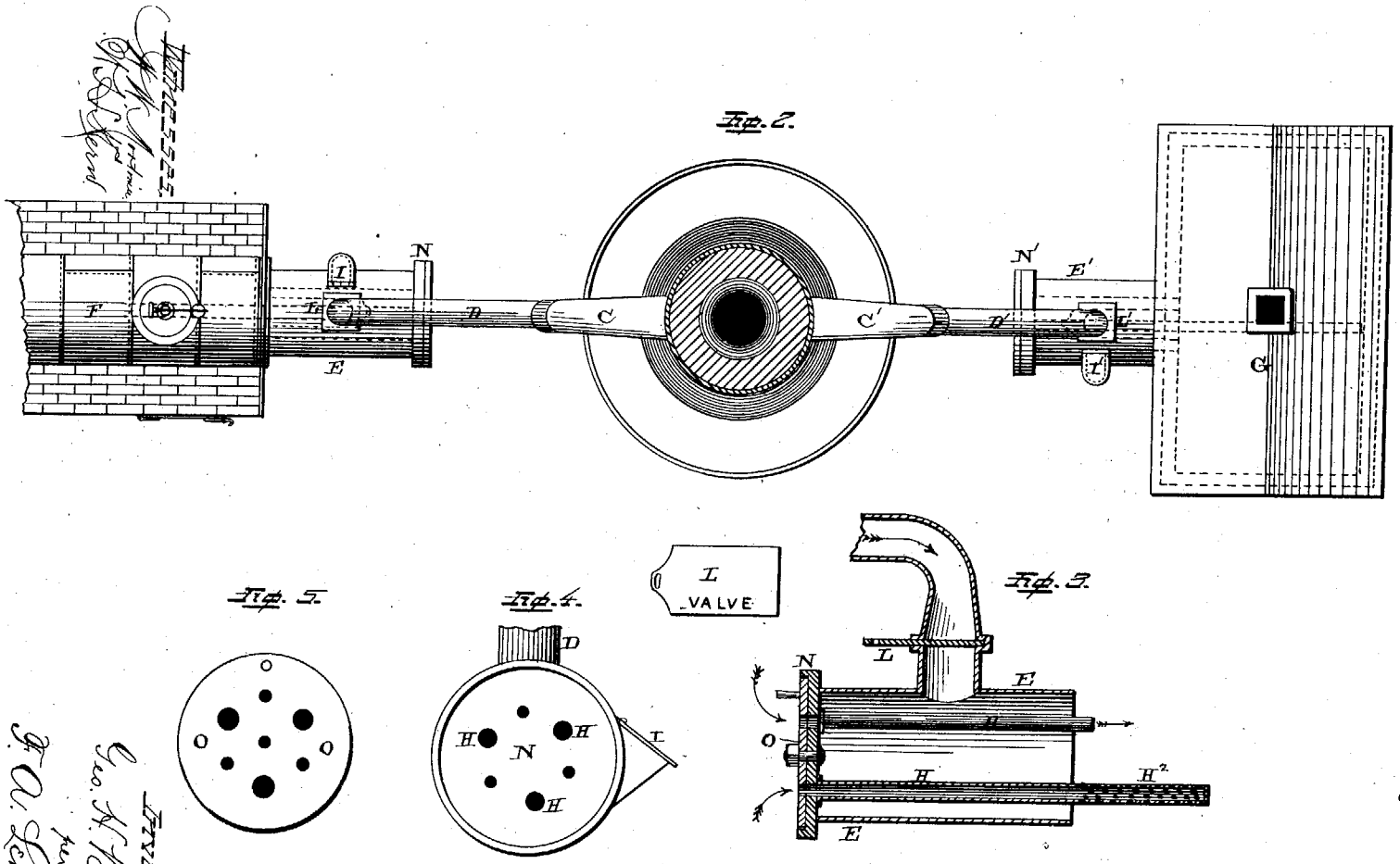
Witnesses.
M. M. Martinez
R. L. Kern
Inventor
Geo. H. Baldwin
per
F. A. Lehmann,
Atty.
N. PETERS. Photo-Lithographer. Washington. D. C.

UNITED STATES PATENT OFFICE.

GEORGE H. BALDWIN, OF HOLLIDAYSBURG, PENNSYLVANIA.

GAS-FURNACE.

SPECIFICATION forming part of Reissued Letters Patent No. 10,329, dated May 22, 1883.

Original No. 150,811, dated May 12, 1874. Application for reissue filed March 27, 1882.

*To all whom it may concern:*

Be it known that I, GEO. H. BALDWIN, of Hollidaysburg, in the county of Blair and State of Pennsylvania, have invented certain new and useful Improvements in Gas-Furnaces; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to an improvement in gas-furnaces; and it consists, first, in the combination of a furnace, a pipe leading therefrom, a combustion-chamber provided with a relief-valve, a boiler-setting, and a pipe or pipes for the admission of air into the combustion-chamber; second, in the combination of a boiler-setting, a combustion-chamber connected thereto, and a suitable pipe for the introduction of the products of combustion from a reducing-furnace, with a perforated pipe or pipes for the introduction of atmospheric air and a relief-valve; third, in the combination of a reducing-furnace, a pipe connected thereto for carrying off the products of combustion, a combustion-chamber connected to a boiler-setting or other appliance, and provided with a relief-valve, the pipes H for the introduction of atmospheric air, and suitable registers.

The object of my invention is to utilize the gases and heat of blast-furnaces for the heating of hot-ovens, or to assist in the generation of steam in boilers, and thus utilize these products of combustion, which have heretofore been allowed to pass off freely into the air, and thereby effect a great saving in the use of fuel and manual labor.

Figure 1 represents a longitudinal vertical section, partly in elevation, of the blast-furnace, hot-oven, gas-receiving chambers, and pipes. Fig. 2 is a plan view of the same. Figs. 3, 4, and 5 are detail views of the gas-receiving chamber and dampers.

In the drawings, A is the blast-furnace, provided at its mouth with suitable damper, J, and door and gallery for charging the furnace. In the walls of the furnace are arranged flues B B′, connecting at their upper ends with waste-gas and heat pipes C C′, which are provided at or near the ground with sliding doors or chutes for the purpose of withdrawing the heavy bodies which are carried with the waste gas by the force of the blast and fall to the bottom of the pipes. The branch pipes D D′ connect with the pipes C C′, and are provided with dampers L L′, for regulating the quantity of gas and heat to be admitted into the gas-chamber, and, if need be, effectually closing the said branch pipes while repairing or cleaning out the gas-chambers or hot-blast oven, or the space within the setting of the boiler, or for any other purpose. The gas chambers or receptacles E E′, into which the waste gas and heat of a furnace are conveyed or conducted by branch pipes D D′, are so constructed that when the said gas and heat are admitted therein the cold or atmospheric air passing into said chamber, and through the short and long pipes H H′ and H $H^2$ securely fastened therein, seizes and commingles with it so effectually that it is forced into the combustion-chambers of the hot-blast oven or of the boiler, producing an intense heat, thereby more rapidly heating the air in the hot-blast pipes within the oven G or the water in the steam boiler or boilers within the air-tight setting F. The heads N N′ of the gas-chamber E E′ are each provided with oscillating or sliding perforated registers or regulators O O′, to regulate the admission of atmospheric air into the gas-chamber, and through the short pipes H H′, and through the long pipes H $H^2$ fixed therein, and thus into the combustion-chamber, as described above. To the heads N N′ are connected short air-pipes H H′, open at both ends, and the long air-pipes closed at their inner ends, but properly perforated within the combustion-chamber. The inner ends of the short pipes may stop short of the inner end of the gas-chamber E′, or may extend beyond the same into the combustion-chamber, and the long pipes may stop short at any distance beyond the inner face of the combustion-chamber wall, or may be extended to any distance beyond the same, always providing that the perforations $H^2$ have no obstructions.

As will appear from the foregoing description, both the boiler-setting F and the hot-blast oven G become of necessity comparatively air-tight combustion-chambers in every sense of the word.

The purpose of the short air-pipes H H′ is to increase the draft from and in the waste gas and heat pipes and flues of the furnace, and to strengthen and invigorate the flame as it passes into the combustion-chamber. The purpose of the long pipes H $H^2$ is to convey the fresh air to any required distance into the combustion-chamber, and thus gradually heat it, thus, by means of the perforations, distributing the warm fresh air among the particles of the gases already in process of combustion into the aforesaid combustion-chamber, thereby most effectually intensifying the heat produced within the said hot-blast oven or boiler-setting and effecting all the purposes of this invention, and at the same time preventing in a most marked degree the choking of the furnace and flues and reducing the actual cost of working furnaces, boilers, and hot-blast ovens.

The extra holes or perforations in the heads or ends N′ of the gas-chamber E′ are for the purpose of increasing the supply of fresh air to the gas-chamber in order to force the gases and heat into the combustion-chamber with greater velocity.

In the sides of the gas-receiving chambers I arrange hinged doors I I′, which act as safety-valves by allowing the gases to escape from the said chambers when the pressure becomes too great by reaction or other cause, and explosions are thereby prevented.

If desired, a blowing-engine or other blast apparatus may be connected to the gas-receiving chamber to force air in, if necessary, or if it is desired to force the combustion of the gases. The current created in the pipes and gas-chambers by the withdrawal of the gases from the blast-furnace assists in withdrawing the heavy gases therefrom, and prevents the furnace from choking. A very simple manner of imparting the desired speed to the hot gases is by the use of a jet of air through the mouths of the pipes. The course of the gases and air is indicated by the arrows. The safety-doors of the gas-receiving chambers are inclined, so as to maintain closed positions by their weight and yet allow them to open instantly to relieve the pressure in case of reaction.

I am aware that there is nothing new in passing the waste gases of a furnace into a boiler, mixing the gases with air and burning the mixture as fuel; but I am not aware that this has ever been done in connection with a relief-valve, which opens from undue pressure of the gases or in case of explosions.

I am also aware that gases have been prepared in a special furnace for that purpose and used in connection with a blast of compressed air, the air and gas being mingled so as to form a blow-pipe for the reduction of metals, and used in connection with a chamber located back of the point of combustion, and which is provided with a relief-valve. This last-named device could not be used in connection with a boiler, because the blow-pipe blast would instantly burn a hole in the boiler, and can only be used in a furnace open at both top and bottom, so that the metal can run away as fast as reduced, and so that the products of combustion can freely escape. As this chamber has no means for admitting air at its outer end, combustion can only be kept up by forcing the air in under pressure, and hence makes the use of an air-engine necessary. All of this I disclaim, because my invention differs therefrom in the object and results attained in every way.

Having thus described my invention, I claim—

1. The combination of a blast or reducing furnace, and a pipe leading therefrom for the purpose of conducting the waste products of combustion to a combustion-chamber, with the chamber in which the waste products of combustion are mingled with atmospheric air, and which chamber is provided with a relief-valve, a boiler-setting or other equivalent appliance, and a pipe or pipes which conduct the air into the chamber to mingle with the gases before they reach the point at which they are consumed, substantially as shown.

2. The combination of a boiler-setting or other equivalent appliance, a combustion-chamber which is connected thereto, but placed outside of it, and a pipe for conducting the waste products of combustion from a blast or reducing furnace into the combustion-chamber to be mixed with atmospheric air, with a pipe or pipes for the introduction of the air to mingle with the gases before they reach the point at which they are consumed, and a relief-valve connected to the chamber, substantially as described.

3. The combination of a reducing-furnace, a pipe connected thereto for carrying off the products of combustion, a combustion-chamber connected to a boiler-setting or other appliance, and provided with a relief-valve, the pipes H, for the introduction of atmospheric air, and suitable registers, substantially as set forth.

In testimony that I claim the foregoing I have hereunto set my hand this 3d day of February, 1882.

GEO. H. BALDWIN.

Witnesses:
A. MONTGOMERY,
ANDREW GARD.